(12) United States Patent
Aluko (10) Patent No.: US 10,638,787 B2
(45) Date of Patent: May 5, 2020

(54) DEVICE AND METHOD FOR PEELING BEANS

(71) Applicant: Olanrewaju Aluko, Lagos (NG)

(72) Inventor: Olanrewaju Aluko, Lagos (NG)

( * ) Notice: Subject to any disclaimer, the term of this patent is extended or adjusted under 35 U.S.C. 154(b) by 49 days.

(21) Appl. No.: 15/767,585

(22) PCT Filed: Oct. 19, 2015

(86) PCT No.: PCT/IB2015/058009
§ 371 (c)(1),
(2) Date: Apr. 11, 2018

(87) PCT Pub. No.: WO2017/068390
PCT Pub. Date: Apr. 27, 2017

(65) Prior Publication Data
US 2018/0295871 A1    Oct. 18, 2018

(51) Int. Cl.
*A23N 15/10* (2006.01)
*A47J 17/18* (2006.01)
*A23N 5/00* (2006.01)
*A23N 15/08* (2006.01)
*A23N 7/00* (2006.01)

(52) U.S. Cl.
CPC ............ *A23N 15/10* (2013.01); *A23N 5/002* (2013.01); *A23N 7/00* (2013.01); *A23N 15/08* (2013.01); *A47J 17/18* (2013.01)

(58) Field of Classification Search
CPC ........ A23N 15/08; A23N 15/10; A23N 5/002; A23N 7/00; A47J 17/18
USPC .......... 99/574, 575, 580, 581, 571, 589, 593
See application file for complete search history.

(56) References Cited

U.S. PATENT DOCUMENTS

| | | | | | |
|---|---|---|---|---|---|
| 1,645,324 | A | * | 10/1927 | Hamachek | A23N 15/10 209/693 |
| 1,743,240 | A | * | 1/1930 | Ryder | A23N 15/10 209/616 |
| 2,004,497 | A | * | 6/1935 | Bajda | A23G 1/02 426/444 |
| 3,024,821 | A | * | 3/1962 | Bean | A23N 7/01 99/586 |
| 3,123,114 | A | * | 3/1964 | Andrews et al. | A23N 1/003 99/512 |

(Continued)

FOREIGN PATENT DOCUMENTS

| | | |
|---|---|---|
| CN | 1976602 A | 6/2007 |
| CN | 101849648 A | 10/2010 |

(Continued)

OTHER PUBLICATIONS

Translation CN103798935 (Year: 2019).*

(Continued)

*Primary Examiner* — Ibrahime A Abraham
*Assistant Examiner* — Frederick F Calvetti
(74) *Attorney, Agent, or Firm* — Adler Pollock & Sheehan P.C (57) ABSTRACT

The present invention discloses a device and method for peeling beans and separating the hulls from the peeled beans. The device for peeling beans comprising a rough disc (3) in a bowl (2), driven by an electric motor (1), to abrasively impact beans in water. A barrier ring (4) enables separation of the hulls from the beans and a special filter (5) gathers the hulls out of the mixture.

5 Claims, 6 Drawing Sheets

(56) References Cited

U.S. PATENT DOCUMENTS

| | | | | |
|---|---|---|---|---|
| 3,132,681 | A | * | 5/1964 | Keen .................... B02C 9/02 |
| | | | | 426/483 |
| 5,613,430 | A | * | 3/1997 | Lee .................... A47J 19/025 |
| | | | | 99/510 |
| 2017/0106556 | A1 | * | 4/2017 | Bucks .................... B26D 5/08 |

FOREIGN PATENT DOCUMENTS

| CN | 202184629 | U | | 4/2012 | |
|---|---|---|---|---|---|
| CN | 103269609 | A | | 8/2013 | |
| CN | 103517659 | A | | 1/2014 | |
| CN | 103798935 | | * | 5/2014 | |
| CN | 103798935 | A | | 5/2014 | |
| DE | 342441 | C | | 10/1921 | |
| GB | 165345 | A | * | 6/1921 | .............. A47J 17/06 |
| GB | 2284140 | A | | 5/1995 | |
| GB | 2506847 | A | | 4/2014 | |
| WO | 2005122801 | A1 | | 12/2005 | |
| WO | 2012077017 | A1 | | 6/2012 | |

OTHER PUBLICATIONS

Translation CN103798935 supplemental (Year: 2019).*
International Search Report and Written Opinion received in International Application No. PCT/IB2015/058009 dated Jul. 1, 2016, 9 pages.
Gao et al., "Mung Bean Peeling Machine, Has Roller Comprising Upper Surface Provided With Round Hole, and Paper Plate Comprising Roller Groove Inner Wall Divided Into Multiple Groups That Are Uniformly Distributed on Circumference Cylinder Inner Wall", WPI / Thomson Scientific, 2014-N24839, XP002758848, vol. 24, No. 47, 1 page.

* cited by examiner

DEVICE AND METHOD FOR PEELING BEANS

CROSS REFERENCE TO RELATED APPLICATIONS

This application is a national phase filing under 35 U.S.C. § 371 of International Application No. PCT/IB2015/058009 filed Oct. 19, 2015, the entire contents of which is hereby incorporated by reference herein.

TECHNICAL FIELD

The present invention relates to a device for peeling beans and for separating the hulls from the peeled beans, and to a method for peeling beans and separating the hulls from the peeled beans.

BACKGROUND ART

Delicacies made from peeled beans, particularly lentil and cowpea beans, provide a good source of protein and have numerous health benefits. However, peeling beans manually is laborious and discourages many from enjoying the different kind of meals that can be made from peeled beans.

Current peeling methods include soaking the beans and manually peeling by rubbing the soaked beans between palms after which multiple decanting with water will follow to separate the hull from the peeled beans. This method is time consuming and very tasking.

Some also use devices meant for blending to attempt beans peeling with risk of blending the beans in the process. This is usually followed by multiple decanting to separate the hulls from the peeled beans. The wastage of the beans lost to unintended blending and the time and water consumed makes this method undesirable.

Various machines for peeling beans are known. Some comprising rods to stir beans soaked in water thus creating a mixture containing beans and hulls. Reference is made to the following documents:

D1 DE 342441 C (TALLGREN H) 18 Oct. 1921
D2 PCT/IB2011/055390 (KONINKLIJKE PHILIPS ELECTRONICS N.V) 30 Nov. 2011
D3 GB 165345 A (HENRIK TALLGREN) 30 Jun. 1921

D1 and D3 discloses devices for peeling pretreated beans, peas, and other legumes, comprising beater rods, several screening areas, and flushing out peeled beans with pulsating stream of water.

D2 also discloses a device for dehulling beans, however, the device features are not described in details. It describes the use of a device for peeling beans and a second unit which can be a vacuum device fixed to or detachable from the main device or a separate vacuum device which could suck up the hulls. It further discloses that this second unit can be driven by the main driving motor, or alternatively by another driving means separated from the main driving motor.

The methods and devices described in D1, D2, and D3 have not been seen in any domestic application and may not have domestic or home application because of the size of the devices described.

In general, known methods and devices for peeling beans dry or wet are not fit for domestic or home use and, therefore, not readily available to the vast consumers of meals or delicacies made from peeled beans because of the bulky nature of the devices to accomplish the peeling.

There is currently no suitable method or device for peeling beans and separating the hull from the peeled beans in domestic or home applications. There is, therefore, a need to take the drudgery out of beans peeling and separation of the beans from the hulls. It is required to reduce the processing time, reduce beans wastage, minimize the use of water required during peeling of beans, and make the device compact for domestic application.

SUMMARY OF INVENTION

In view of the above, there is provided a novel solution to virtually eliminate the intense labour involved in peeling beans, reduce the time involved, optimize the use of water, and present a device and method, with many inventive steps, that can be used in domestic and industrial applications.

The definitions of the coat or skin of beans herein referred to as peelings or hulls, and what is left after coat removal, herein referred to as dehulled beans or peeled beans are well known in the art and are common terms.

In the first aspect of the invention, there is provided a device for peeling beans comprising a driving motor and a bowl where the beans in water is abrasively impacted with a rough disc in restricted compartment within the bowl so as to generate a mixture containing hulls and peeled beans.

In an embodiment of the invention, the peeling may commence immediately without first soaking the beans, since soaking and abrasive impacting of the beans will occur simultaneously in water. Optionally, the beans may be soaked for 3-5 minutes before commencement of peeling, depending on the type of beans.

In another embodiment of the invention, the beans is restricted by a barrier installed within the bowl to prevent the flow of beans beyond a first compartment, and to contain it within the peeling region, and is also an open gate to allow hulls pass to a second compartment within the bowl.

In a further embodiment of the invention, a special filter is provided within a second compartment of the bowl to gather the hulls from the water.

In the second aspect of the invention, there is provided a method for peeling beans comprising abrasively impacting the beans in water within a restricted compartment within the bowl, with a driving unit, to generate a mixture containing hulls and peeled beans.

In an embodiment of the invention, the peeling may commence immediately without first soaking the beans, since soaking and abrasive impacting of the beans will occur simultaneously in water. Optionally, the beans may be soaked for 3-5 minutes before commencement of peeling, depending on the type of beans.

In another embodiment of the invention there is provided a method to allow the hulls pass to a separate compartment during stirring of the mixture.

In a further embodiment of the invention, there is provided a method to allow collection of the hulls from the water during stirring of the mixture In the present invention, there is provided a device and a method for peeling beans comprising a driving motor and a bowl where the beans in water is abrasively impacted with a rough disc in restricted compartment. The restriction being provided by a barrier that retains beans in the peeling region and is also a gate to allow hulls passage to a special filter that gathers the hulls from the water. Therefore, the peeled beans will remain in one compartment and the hulls are collected in a separate compartment within the bowl in a single process.

BRIEF DESCRIPTION OF DRAWINGS

The invention is now described in more details as follows.

DESCRIPTION OF EMBODIMENTS

Figure 1:
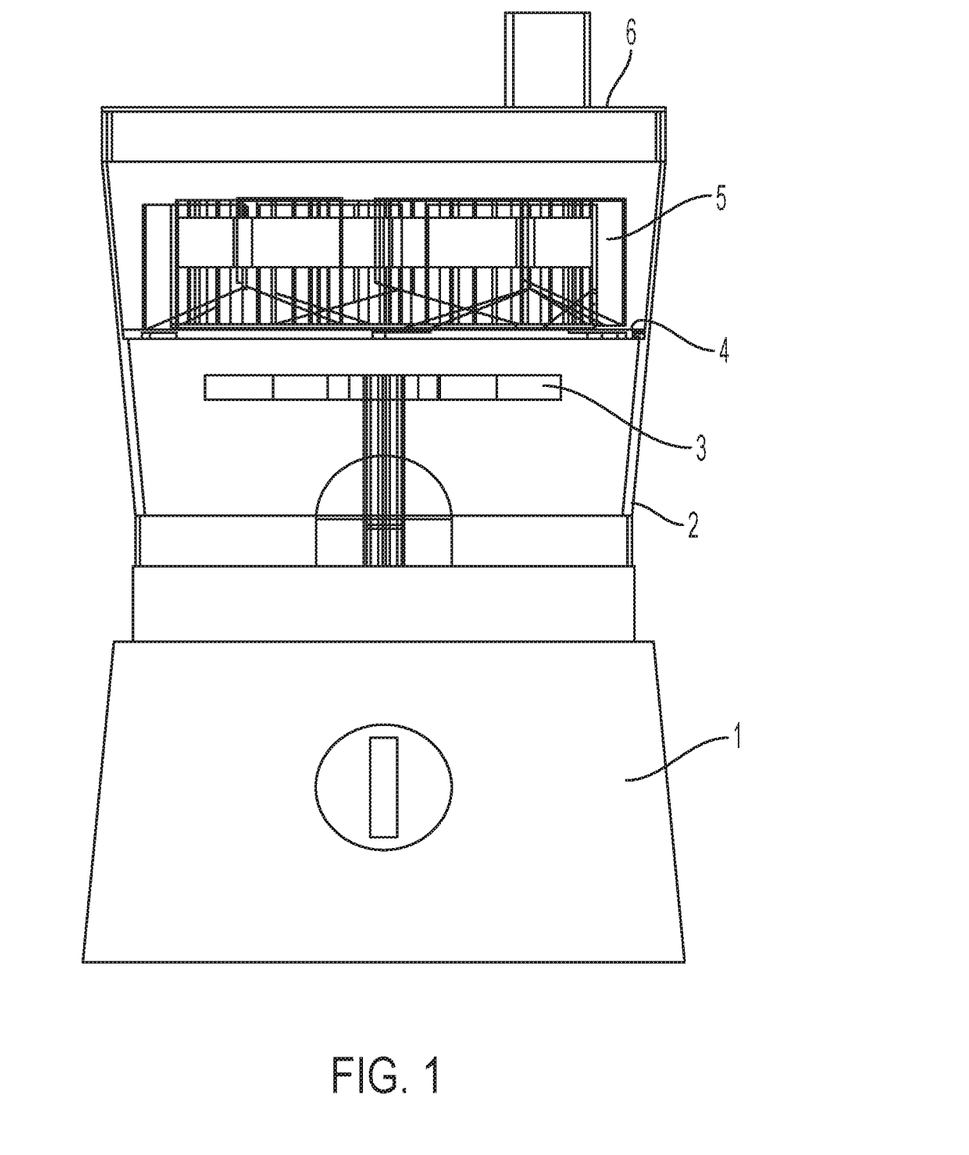
FIG. 1 illustrates the Front View of the device for peeling beans and separating the hulls from the peeled beans according to the first aspect of the invention.
Figure 2:
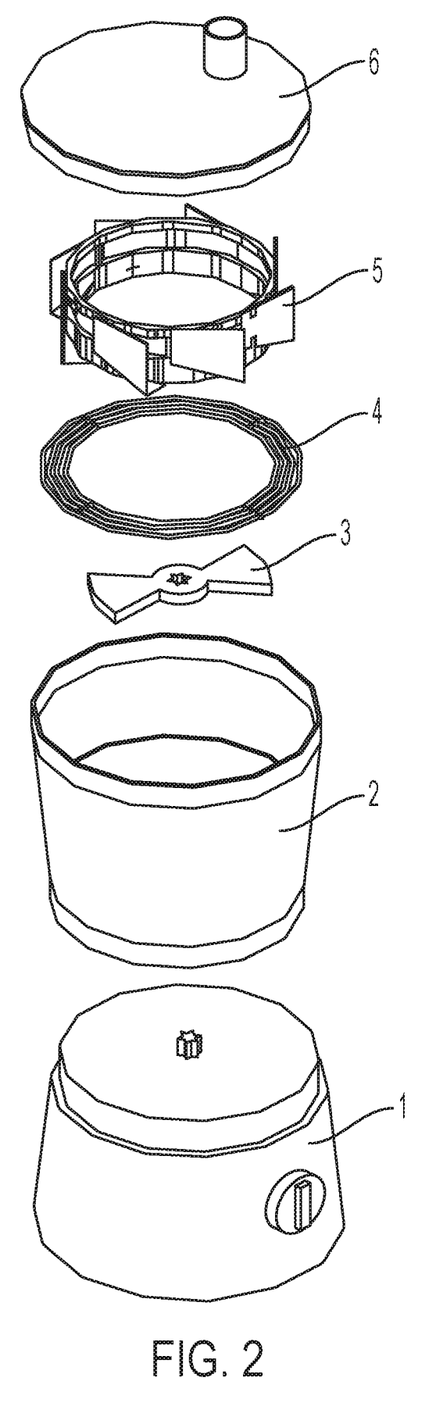
FIG. 2 illustrates an exploded view of the device for peeling beans and separating the hulls from the peeled beans according to the first aspect of the invention.
Figure 3:
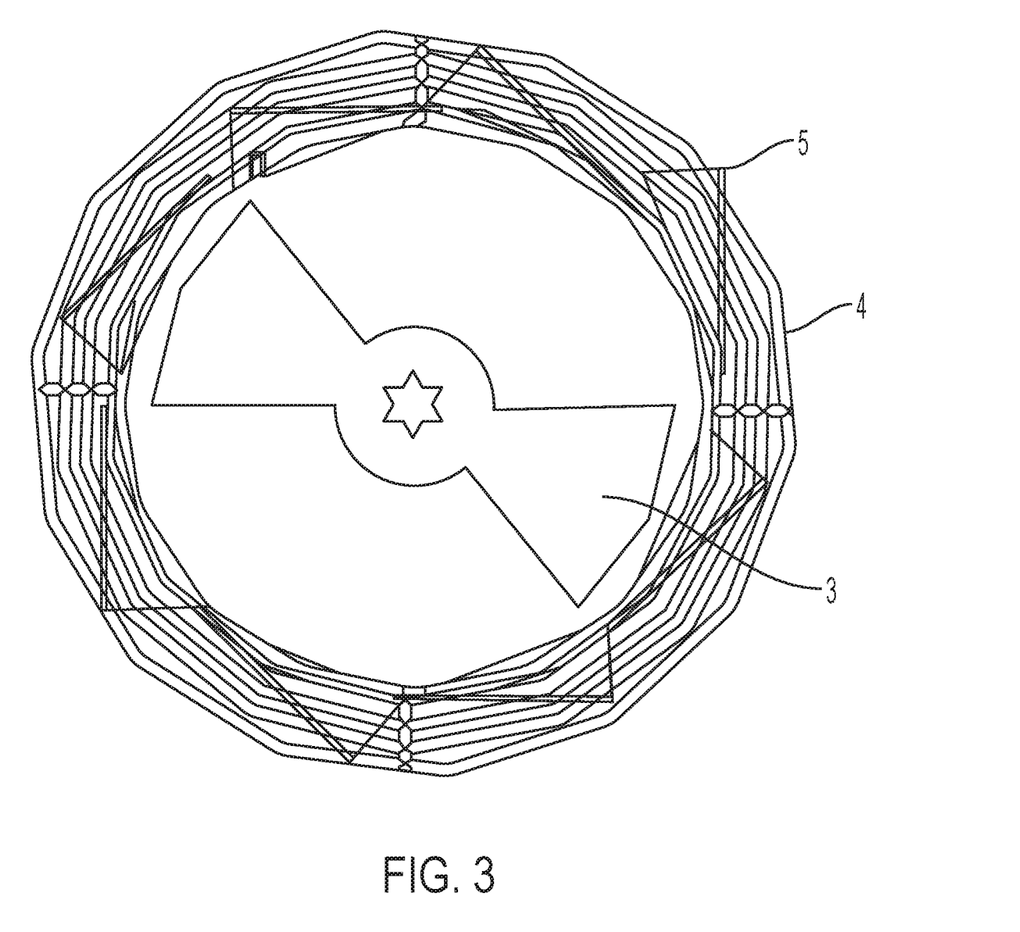
FIG. 3 illustrates the Plan View arrangement of major components of the device for peeling beans and separating the hulls from the peeled beans according to the first aspect of the invention.
Figure 4:
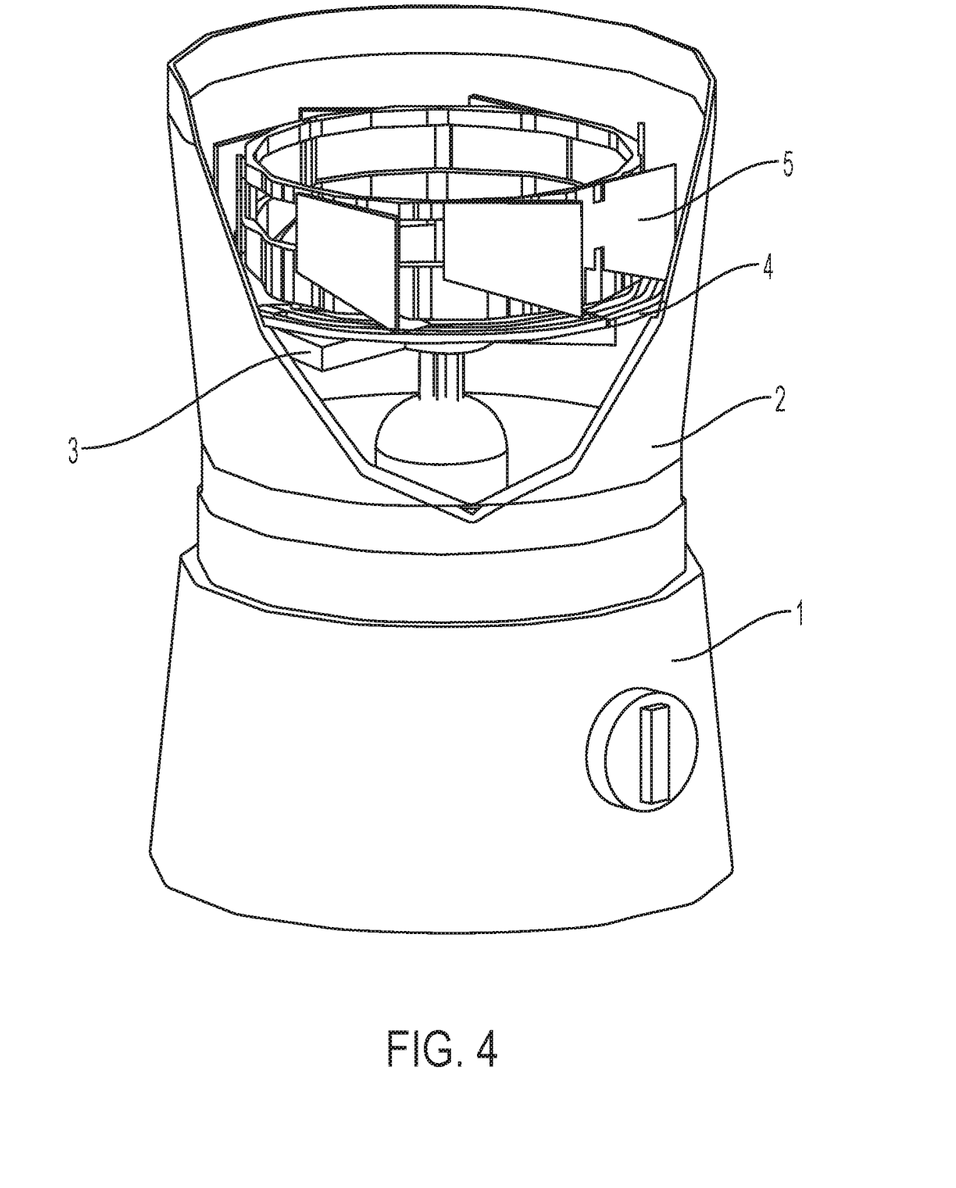
FIG. 4 illustrates an open assembly view of the device for peeling beans and separating the hulls from the peeled beans according to the first aspect of the invention.

The first reference is made to FIG. 1, FIG. 2, FIG. 3, and FIG. 4 which illustrates various aspects of the architecture of the device for peeling beans and separating the hulls from the peeled beans according to an embodiment the invention As illustrated in FIG. 1 the present invention comprises of an electric motor (1) coupled to a bowl (2) with a shaft to drive a rough disc (3) having rough surfaces. The rough disc (3) abrasively impacts the beans in water and creates a vortex flow of water, beans, and the hulls.

In an embodiment of the present invention, the peeling may commence immediately without first soaking the beans, since soaking and abrasive impacting of the beans will occur simultaneously in water. The rough disc (3) is intended to rip off the hulls from the beans in small broken pieces while the peeled beans remain unbroken and relatively large within the mixture.

Optionally, the beans may be soaked for 3-5 minutes before commencement of peeling, depending on the type of beans, or may even be pretreated before introducing into the bowl (2).

In another embodiment of the present invention, a vortex flow is created during stirring of the mixture whereby the centrifugal force tends to push the mixture upwards along the wall of the bowl, and the beans is restricted by a barrier ring (4) to prevent the flow of beans beyond a first compartment, and to contain it within the peeling region.

In a further embodiment of the invention, the barrier ring (4) having gaps between the rings is sized to allow hulls to pass to a second compartment within the bowl. The resultant mixture is forced upwards against the underside of the barrier ring (4), enabling the intended separation of hulls and peeled beans.

In a still further embodiment of the invention, there is provided a special filter (5) in the second compartment of the bowl (2), with multiple side funnels, to gather the mixture of the water and the hulls. The water returns to the first compartment of the bowl (2) while the hulls remain in the special filter (5).

A lid (6) is provided for the bowl (2) for containment and for safety, and may be equipped with an apparatus to further keep the special filter (5) in position during peeling operation. It may also have a hood for adding more water, if required, during use.

Figure 5:
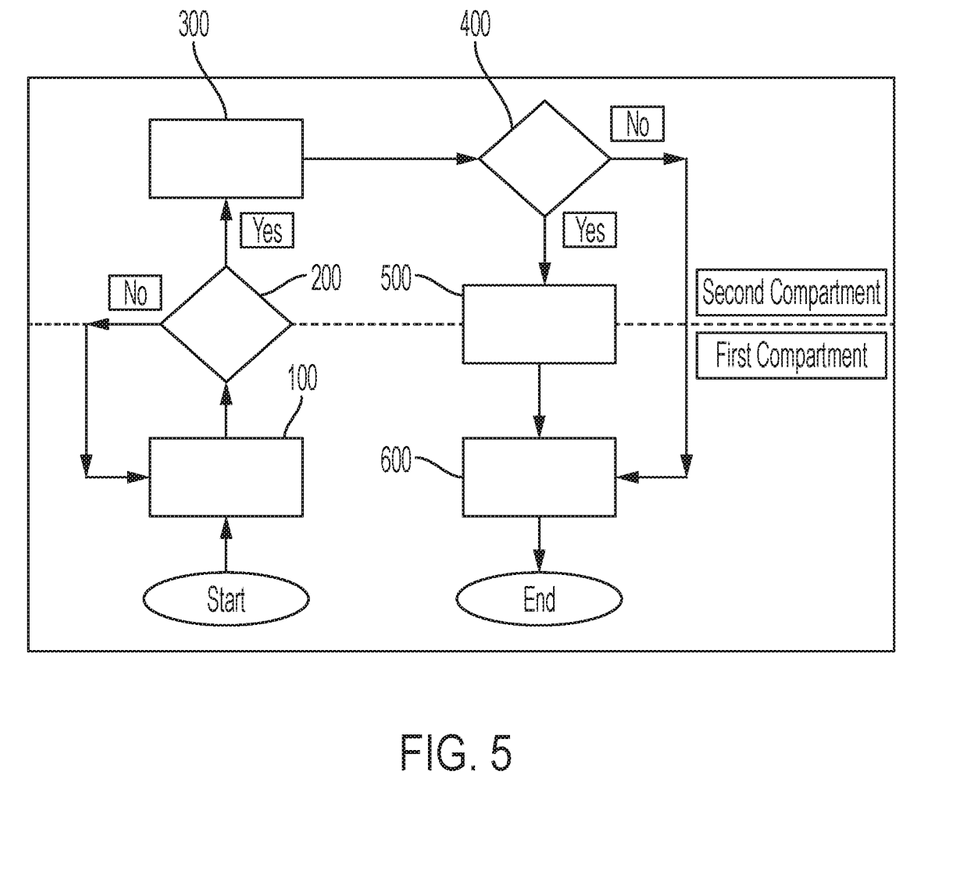
FIG. 5 schematically illustrates a flow chart of a method of peeling beans and separating the hulls from the peeled beans according to the second aspect of the invention.

The second reference is made to FIG. 5 which schematically illustrates a flow chart of a method of peeling beans and separating the hulls from the peeled beans according to another embodiment of the invention.

As illustrated in FIG. 5 at step 100, the beans in water is abrasively impacted by a rough disc in a restricted compartment to produce a mixture of hulls and peeled beans At step 200 the size of the particles in the mixture is checked at the barrier ring (4). If hulls have been produced and the size is less than specified gap between the rings of the barrier ring (4), say 3 mm, they pass to step 300, else step 100 continues.

At step 300 some of the hulls produced from step 100 have reached the second compartment of the bowl (2) having passed through the barrier ring (4), the flow being powered by the centrifugal force from rotation of a rough disc (3) driven by an electric motor (1).

At step 400 the size of the hulls in the water is checked. If hull size is more than a specified gap of mesh, say 0.5 mm, they are trapped by a filter.

At step 500 the hulls are trapped after the check of step 400. The trapping apparatus is a special filter (5) having multiple side funnel to gather the mixture from the wall of the bowl (2) towards the center.

At step 600 the water in the mixture gathered by the special filter (5) drains back to the first compartment of the bowl (2) through the mesh of the special filter (5).

Step 100-600 continue simultaneously until virtually all the bean seeds are peeled and remain in the first compartment, while most of the hulls are trapped in the special filter (5) in the second compartment of the bowl (2).

Figure 6:
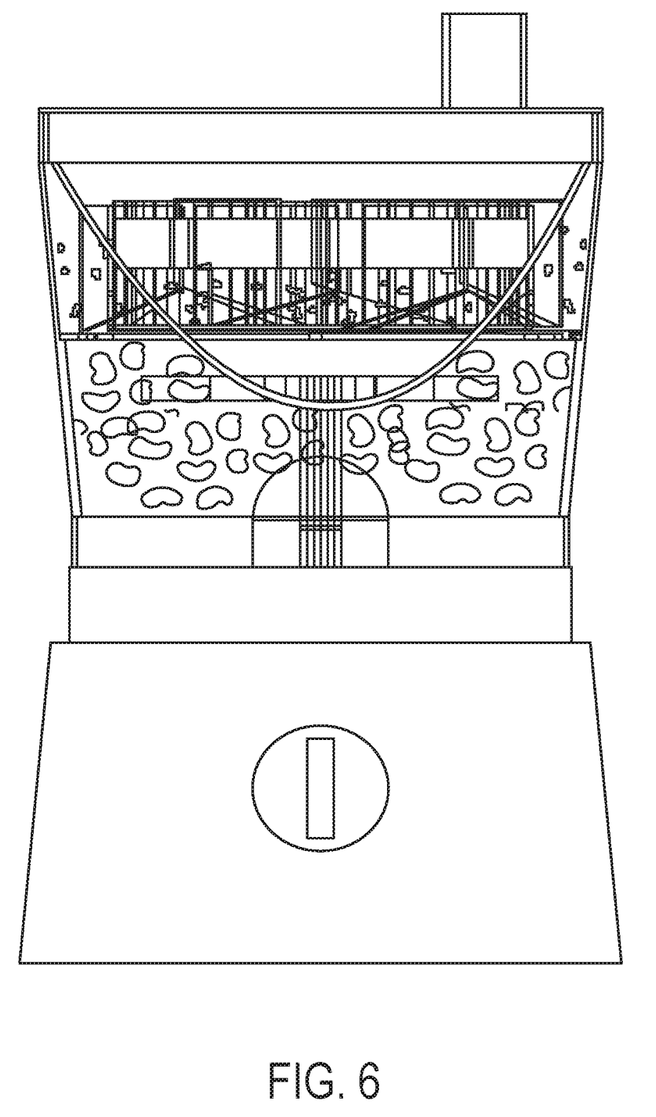
FIG. 6 illustrates the flow pattern in the device for peeling beans and separating the hulls from the peeled beans during use.

The third reference is made to FIG. 6 which illustrates the flow pattern in the device for peeling beans and separating the hulls from the peeled beans during use.

As illustrated in FIG. 6 a U-shaped flow pattern is formed during rotation of the rough disc (3) and a barrier ring (4) restricts the extent of flow of beans within the mixture, while allowing the hulls to reach a second compartment where a special filter (5) with multiple funnel gathers the mixture from the wall of the bowl and directs it towards the center for trapping of the hulls.

The present invention is by no means limited to the disclosed embodiments. The invention extends to any novel combination of the features disclosed, or modification and equivalent arrangements of devices, or the steps, or methods, or processes so disclosed.

INDUSTRIAL APPLICABILITY

There is a growing trend for legume consumption, especially processed beans, particularly peeled beans for making different kinds of meals with huge health benefits.

The present invention will provide every household, restaurants, hotels, food processing plants, and similar industry, a device for conveniently peeling beans, and separating the hulls, before further processing the peeled beans into desired delicacies.

There is provided a compact, efficient, and effective peeling method for beans in domestic and industrial application.

The invention claimed is:
1. A device for peeling beans and separating the hulls from peeled beans comprising:

a disc having rough surfaces inside a bowl, for abrasively impacting beans in water within a peeling region bounded by a barrier ring having gaps between rings, a size of the gaps preventing the beans but allowing the hulls to pass to a collection region where the hulls may be trapped by a filter, and an electric motor for driving the disc having rough surfaces.

2. The device according to claim 1, wherein the rings are equally spaced for separation of peeled beans and hulls.

3. The device according to claim 1, wherein the filter comprises multiple funnels to gather and trap the hulls.

4. The device according to claim 1, wherein the filter further comprises a mesh that is sized to trap the hulls.

5. The device according to claim 1, wherein the wall of the bowl in the peeling region comprises a rough surface.

\* \* \* \* \*